E. L. AIKEN.
PHONOGRAPH SPEED REGULATOR.
APPLICATION FILED FEB. 20, 1906.
1,036,407.
Patented Aug. 20, 1912.
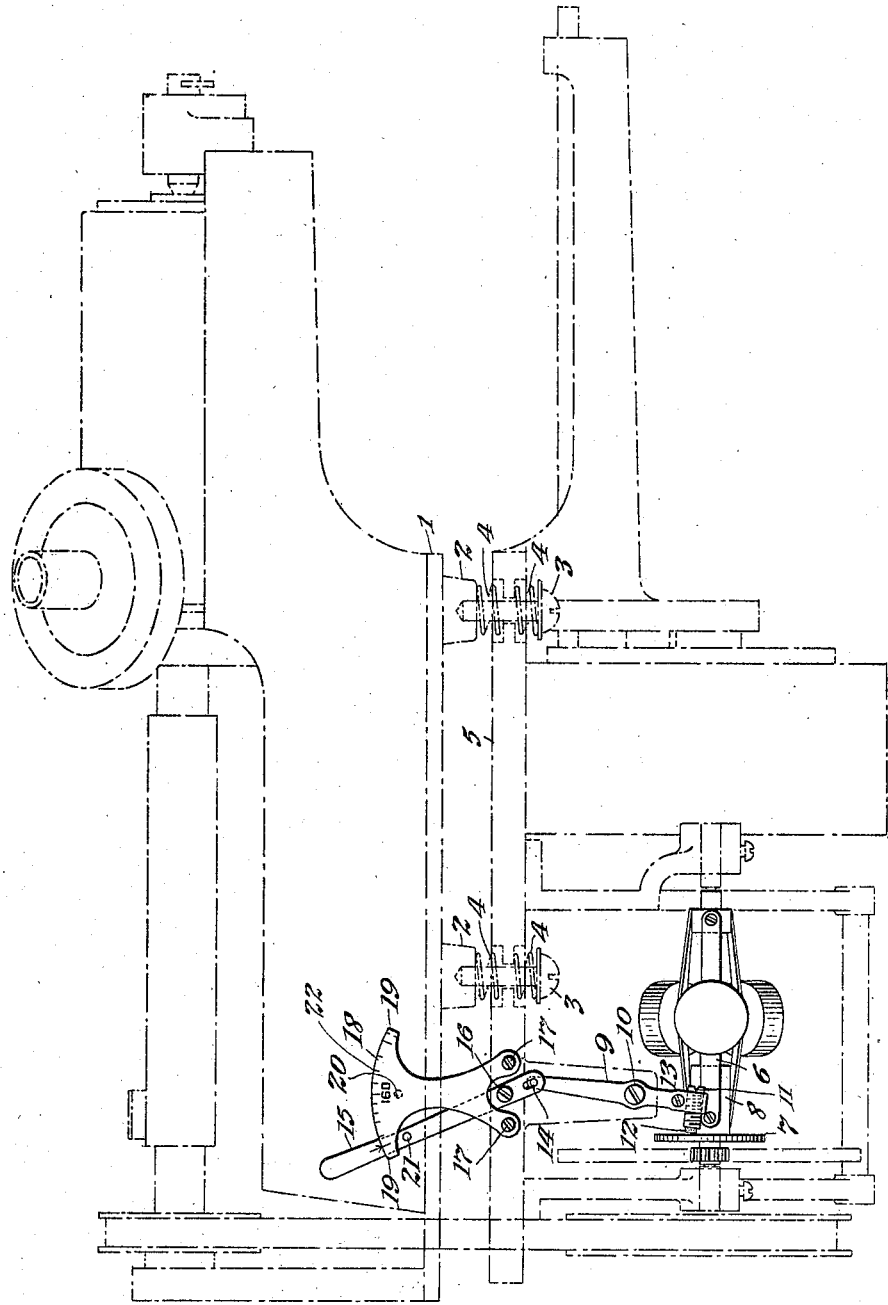

UNITED STATES PATENT OFFICE.

EDWARD L. AIKEN, OF EAST ORANGE, NEW JERSEY, ASSIGNOR, BY MESNE ASSIGNMENTS, TO THOMAS A. EDISON, INCORPORATED, OF WEST ORANGE, NEW JERSEY, A CORPORATION OF NEW JERSEY.

PHONOGRAPH SPEED-REGULATOR.

1,036,407.     Specification of Letters Patent.     Patented Aug. 20, 1912.

Application filed February 20, 1906. Serial No. 301,982.

*To all whom it may concern:*

Be it known that I, EDWARD L. AIKEN, a citizen of the United States, and a resident of East Orange, in the county of Essex and State of New Jersey, have invented certain new and useful Improvements in Phonograph Speed-Regulators, of which the following is a description.

My invention relates to phonograph or talking machine speed regulators wherein a friction pad is caused to bear against a slidable friction disk carried by the motor governor. In the use of instruments of this character, it is desirable that means be provided for starting and stopping the motor and for regulating and indicating the speed thereof. It is also desirable that the mechanism for accomplishing this result shall be simple and readily accessible and at the same time that such mechanism when applied to phonographs wherein the motor frame is carried on or between suspension springs, as set forth and claimed in United States Patent No. 798,478 granted to me on August 29, 1905, shall not transmit the vibrations set up by the rotation of the motor to the body or bed-plate of the phonograph proper.

My invention has for its object the production of a device of this character which shall possess the desirable qualities above set forth, which shall provide an adjustment of the friction pad, which shall be of very few parts and capable of being applied to standard types of phonographs.

Reference is hereby made to the accompanying drawing which shows a front elevation of a phonograph operated by a motor carried by the body of the instrument through suspension springs, said parts being shown in dotted lines and one form of my invention, together with the motor governor, being shown in full lines.

The body or bed plate 1 of the phonograph rests in the usual manner upon a cabinet (not shown) and is provided with downwardly projecting bosses 2 in which are threaded screws 3, 3 upon which are placed pairs of spiral springs 4, 4. Floated between the springs of each pair and upon the bolts 3 is a motor frame 5 carrying a motor of any approved form, such as a spring motor having the usual governor 6 which comprises a friction disk 7 carried by a sliding sleeve 8. A lever 9 is pivoted to the motor frame by a screw 10 which is threaded into said frame. The lower end of the lever 9 is provided with a screw 11 which is threaded therein and carries at its end a friction pad 12 adapted to press against the disk 7. This screw is clamped in any desired position of adjustment by a screw 13, the end of the lever 9 being split in a well known manner so as to be clamped upon the screw 11 to hold the same against turning. Above the lever 9 and connected thereto by a pin and slot connection 14 is an operating lever 15. This lever is pivoted on a screw 16 which is threaded in the motor frame 5. The lever 15 extends through an opening in the bed-plate 1 so as to occupy a position where it may be readily operated. The said opening, however, is of such size that the said lever cannot possibly contact with the bed-plate. Rigidly secured to the motor frame 5 by screws 17 is a vertical plate 18. The upper portion of this plate is formed with laterally extending arms, the ends of which are bent at right angles as indicated at 19, so as to form stops limiting the movement of the lever 15 upon its axis in both directions. The upper edge of this plate is curved on an arc described about the pivot of the lever 15, and may be provided with indicating graduations 22, as shown. A depression 20 is preferably formed in the rear face of the plate 18 which is adapted to receive a small pin or elevation 21 carried by the lever 15 in order to hold the lever at or near its central position.

In the position indicated in the drawing the lever 15 is at its extreme left hand position which should be such as to press the friction pad 12 against the disk 7 with a pressure sufficient to prevent rotation thereof. As the lever 15 is moved toward the right it is obvious that the friction pad 12 will be carried away from the disk 7 and will allow the motor to start and gain speed until the friction disk 7 is brought against the pad 12, each position of said pad corresponding to a definite motor speed which may be indicated on the scale 22, if desired. The intermediate position of the lever 15 in which the lever is locked by the engagement of the depression 21 with the projection 20 corresponds to the ordinary speed at which the phonograph operates, and such speed is readily obtained with the lever in this position by adjustment of the screw 11. The positions of the lever 15 to the right of said depression will produce motor speeds which exceed the ordinary. The friction of the parts is sufficient to prevent the pressure of the disk 7 upon the pad 12 from turning the lever 9 upon its pivot. It will be observed that the entire device is carried by the motor frame 5 and is entirely independent of and out of contact with the bed-plate or body of the phonograph, whereby the vibrations of the motor frame will not be transmitted to said body. The levers 9 and 15 may be replaced if desired by a single lever pivoted at 16.

Having now described my invention, what I claim as new and desire to secure by Letters Patent is:

1. In a phonograph speed regulator, the combination with a motor governor comprising a movable friction disk, of a pivoted lever, a screw threaded in said lever and carrying a friction pad adapted to engage the friction disk, means for locking said screw against rotation, an indicator plate having stops thereon, and an arm pivoted to move past said plate between said stops and connected to said lever so as to positively actuate the latter when moved in either direction to control and indicate the position of said pad and the resulting motor speed, substantially as described.

2. In a phonograph, the combination with the body or bed-plate provided with springs, the said bed plate having a vertical slot therein, of a motor frame floated between said springs and carrying a motor adapted to operate the phonograph, said motor comprising a governor and movable friction disk, and means carried by said motor frame for varying the speed of said motor, said means extending vertically above said motor frame and comprising a pivoted lever carrying a friction pad adapted to engage the friction disk of the motor governor and a second pivoted lever for varying the position of the first lever, said second lever extending through the said slot, a plate mounted on the motor frame, adjacent the said lever, and stops on said plate to prevent the said lever from contacting the ends of the slot, substantially as described.

3. In a phonograph, the combination with the body or bed-plate provided with springs, the said bed-plate having a vertical slot therein, of a motor frame resting upon said springs and carrying a motor adapted to operate the phonograph, said motor comprising a governor and movable friction disk, and means carried by said motor frame for varying the speed of said motor, said means comprising a friction pad adapted to engage the friction disk, means for varying the position of the pad relative to the disk, comprising a lever extending through the slot in the bed plate, a plate mounted on the motor frame, adjacent the said lever, and stops on said plate to prevent the said lever from contacting the ends of the slot, substantially as described.

4. In a phonograph, the combination with the body or bed plate provided with springs, the said bed plate having a slot therein, of a motor frame supported by said springs and carrying a motor adapted to operate the phonograph, said motor comprising a governor and a movable friction disk, and means carried by said motor frame for varying the speed of said motor, said means comprising a friction member adapted to engage the friction disk, and means comprising a lever extending loosely through the slot in the bed plate for varying the position of the friction member relatively to the disk, and stops connected with the motor frame to prevent the said lever from contacting the ends of said slot, substantially as described.

This specification signed and witnessed this 13th day of February 1906.

EDWARD L. AIKEN.

Witnesses:
DELOS HOLDEN,
FRANK D. LEWIS.